US012496964B2

(12) United States Patent
Chen

(10) Patent No.: US 12,496,964 B2
(45) Date of Patent: Dec. 16, 2025

(54) LIGHTING CONTROL METHOD, VEHICLE, AND TAILLIGHT CONTROLLER EMPLOYING METHOD

(71) Applicants: Futaijing Precision Electronics (Yantai) Co., Ltd., Yantai (CN); HON HAI PRECISION INDUSTRY CO., LTD., New Taipei (TW)

(72) Inventor: Hsiao-Lun Chen, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 58 days.

(21) Appl. No.: 18/749,536

(22) Filed: Jun. 20, 2024

(65) Prior Publication Data

US 2025/0249825 A1   Aug. 7, 2025

(30) Foreign Application Priority Data

Feb. 1, 2024   (CN) .......................... 202410153077.6

(51) Int. Cl.
*B60Q 1/50* (2006.01)
*B60Q 1/30* (2006.01)
*B60R 1/12* (2006.01)
*F21S 43/00* (2018.01)

(52) U.S. Cl.
CPC ................ *B60Q 1/50* (2013.01); *B60Q 1/30* (2013.01); *B60R 1/12* (2013.01); *F21S 43/601* (2024.05); *B60R 2001/1223* (2013.01)

(58) Field of Classification Search
CPC ............... B60Q 2300/42; B60Q 9/008; B60Q 2300/41; B60Q 1/08; B60Q 2300/312; B60Q 2300/314; B60Q 2300/3321; B60Q 1/14; B60Q 1/1423; B60Q 1/143; B60Q 2300/054
See application file for complete search history.

(56) References Cited

U.S. PATENT DOCUMENTS

| 2015/0172527 A1* | 6/2015 | McElroy | H04N 23/74 |
| | | | 348/148 |
| 2016/0332562 A1* | 11/2016 | Kim | B60Q 1/486 |
| 2019/0193626 A1* | 6/2019 | Park | B60W 40/105 |

FOREIGN PATENT DOCUMENTS

CN   115402193   11/2022

* cited by examiner

*Primary Examiner* — Wei (Victor) Y Chan
(74) *Attorney, Agent, or Firm* — ScienBiziP, P.C.

(57) ABSTRACT

A lighting control method applied to a taillight controller, the taillight controller is installed on a first vehicle, the first vehicle configures with a taillight, the taillight is communicated with the taillight controller, the lighting control method comprising: obtaining influence parameters when a second vehicle is behind the first vehicle, wherein the influence parameters indicate whether the second vehicle violates a driving safety rule of the first vehicle; determining an objective brightness value of the taillight when the second vehicle violates the driving safety rule of the first vehicle; and sending brightness control instructions to the taillight, adjusting the brightness of the taillight to the objective brightness value based on the brightness control instructions. A vehicle and a taillight controller employing method are also disclosed.

18 Claims, 6 Drawing Sheets

LIGHTING CONTROL METHOD, VEHICLE, AND TAILLIGHT CONTROLLER EMPLOYING METHOD

FIELD

The subject matter herein generally relates to lighting control field.

BACKGROUND

Vehicles have important roles in our daily travel, and a lot of emphases has been placed on driving safety rule of the vehicles.

During driving, if driving operations of a driver in a second vehicle behind a first vehicle are not standardized, vehicle accidents may happen.

BRIEF DESCRIPTION OF THE DRAWINGS

Implementations of the present disclosure will now be described, by way of embodiments, with reference to the attached figures.

DETAILED DESCRIPTION

Figure 1:
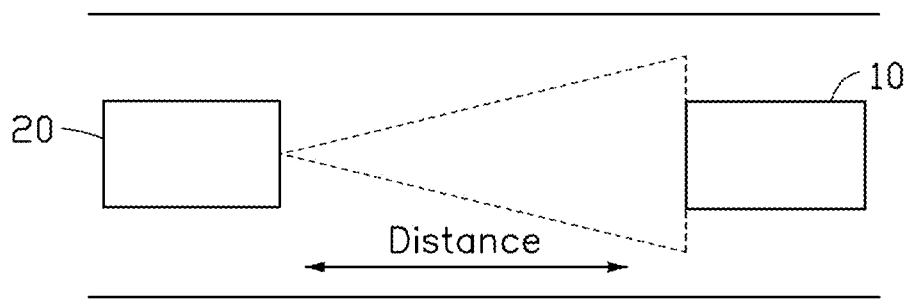
FIG. 1 is an application scenario diagram illustrating an embodiment of a lighting control method according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The connection can be such that the objects are permanently connected or releasably connected. The term "comprising," when utilized, means "including, but not necessarily limited to;" it specifically indicates open-ended inclusion or membership in the so-described combination, group, series, and the like.

FIG. 1 is an application scenario diagram illustrating an embodiment of a lighting control method according to the present disclosure.

In the application scenario diagram, a second vehicle 20 is behind a first vehicle 10 in a driving road.

Figure 2:
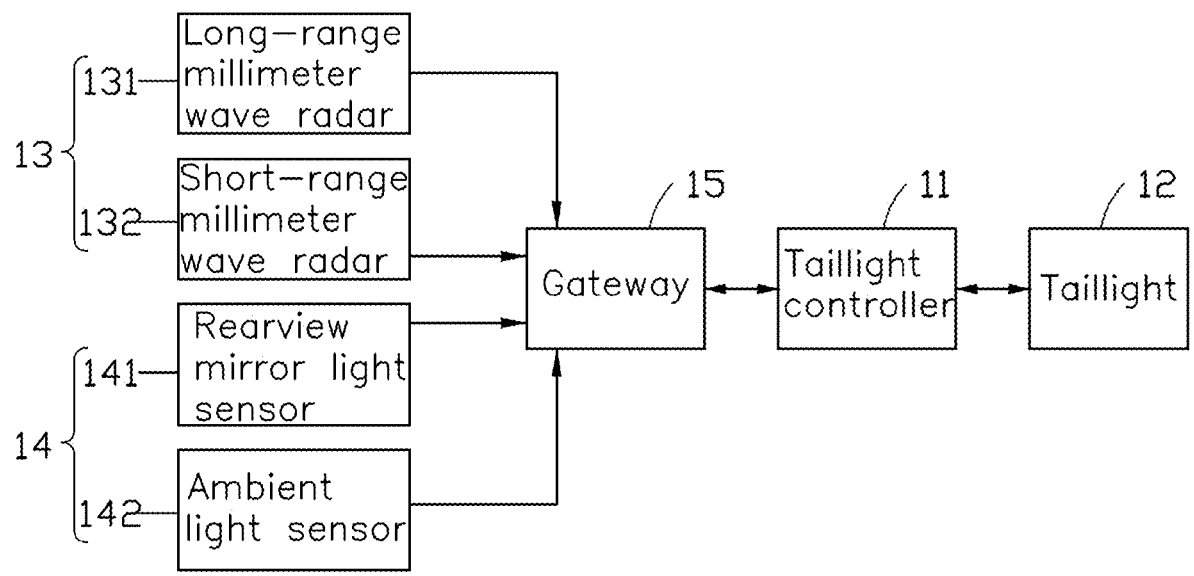
FIG. 2 is a diagram showing an embodiment of a lighting control method according to the present disclosure.
Figure 3:
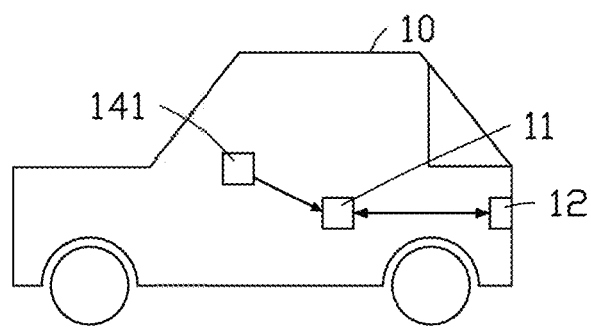
FIG. 3 is a diagram illustrating an embodiment of a vehicle according to the present disclosure.

Please refer to FIG. 2 and FIG. 3, a taillight control system is installed on the first vehicle 10, the taillight control system includes a taillight controller 11 and a taillight 12.

The taillight controller 11 is a device of automatically performing numerical calculations and/or information processing in accordance with pre-programmed or stored instructions. The taillight controller 11 can be a standalone device or integrated in a gateway 15 or the taillight 12 as shown in FIG. 2.

The taillight controller 11 performs the lighting control method. The lighting control method includes: influence parameters are obtained when a second vehicle 20 is behind the first vehicle 10, the influence parameters indicate whether the second vehicle 20 violates a driving safety rule of the first vehicle 10; an objective brightness value of the taillight 12 is determined when the second vehicle 20 violates the driving safety rule of the first vehicle 10, the objective brightness value is larger than a standard brightness value, and the standard brightness value is a brightness value of the taillight 12 when the second vehicle 20 does not violate the driving safety rule of the first vehicle 10; and brightness control instructions are sent to the taillight 12, the brightness of the taillight 12 is adjusted to the objective brightness value based on the brightness control instructions.

The taillight 12 receives the brightness control instructions from the taillight controller 11 and adjusts the brightness of the taillight 12 to the objective brightness value based on the brightness control instructions.

In the embodiment, when the second vehicle 20 violates the driving safety rule of the first vehicle 10, the brightness of the taillight 12 can be adjusted to the objective brightness value based on the brightness control instructions, and the driving safety rule of the first vehicle 10 can be improved.

In one embodiment, the influence parameters include a distance between the second vehicle 20 and the first vehicle 10 in real time and/or a first light intensity, the first light intensity is a light intensity of light transmitted by the second vehicle 20 to the first vehicle 10. In the embodiment, the first light intensity is the light intensity of the light transmitted by the second vehicle 20 to a rearview mirror of the first vehicle 10.

In an actual application process, the influence parameters can be set according to hardware configuration of the first vehicle 10 and driving safety rule requirements of the first vehicle 10.

If the distance between the second vehicle 20 and the first vehicle 10 in real time is too close, the second vehicle 20 may hit the first vehicle 10. Therefore, the distance between the second vehicle 20 and the first vehicle 10 in real time is set as one influence parameter. When the distance between the second vehicle 20 and the first vehicle 10 in real time is too close, the second vehicle 20 may violate the driving safety rule of the first vehicle 10, the taillight 12 of the first vehicle 10 will warn the driver of the second vehicle 20 to improve driving safety rule.

When light emitted by the second vehicle 20 is transmitted to the first vehicle 10, the rearview mirrors of the first vehicle 10 will reflect the light emitted by the second vehicle

20. If the first light intensity is too large, a driver of the first vehicle 10 may be difficult to clearly observe dynamics behind the first vehicle 10 through the rearview mirrors. Therefore, the first light intensity is one influencing parameter. When the first light intensity is too large, the second vehicle 20 may be violate the driving safety rule of the first vehicle 10, the second vehicle 20 can be warned through the taillight 12 of the first vehicle 10 to improve the driving safety rule.

In one embodiment, the lighting control system also includes a distance detection device 13, and the distance detection device 13 is communicated with the taillight controller 11. For example, the distance detection device 13 is communicated with the taillight controller 11 through the gateway 15 configured on the first vehicle 10.

In one embodiment, the distance detection device 13 is installed at a rear of the first vehicle 10 to detect whether the second vehicle 20 is behind the first vehicle 10, and to detect the distance between the first vehicle 10 and the second vehicle 20.

For example, the distance detection device 13 includes a long-range millimeter wave radar 131 and a short-range millimeter wave radar 132. The long-range millimeter wave radar 131 can detect some vehicle behind the first vehicle 10 in long distances, a detection range of the long-range millimeter wave radar 131 can be from 30 meters to 70 meters. The short-range millimeter wave radar 132 can detect some vehicle behind the first vehicle 10 in short distances, a detection range of the short-range millimeter wave radar 132 can be from 1.5 meters to 30 meters.

If the second vehicle 20 is not detected by the long-range millimeter wave radar 131 and the short-range millimeter wave radar 132, the second vehicle 20 is too far away from the first vehicle 10, or the second vehicle 20 does not exist. If the long-range millimeter wave radar 131 and the short-range millimeter wave radar 132 detect the second vehicle 20, the distance between the second vehicle 20 and the first vehicle 10 in real time detected by the long-range millimeter wave radar 131 and the short-range millimeter wave radar 132 is transmitted to the taillight controller 11, and the taillight controller 11 receives the distance between the second vehicle 20 and the first vehicle 10 in real time to determine that the second vehicle 20 is behind the first vehicle 10.

In one embodiment, the influence parameters include the distance between the second vehicle 20 and the first vehicle 10 in real time, the taillight controller 11 also obtain a safety distance between the first vehicle 10 and the second vehicle 20. The second vehicle 20 violates the driving safety rule of the first vehicle 10, when the distance between the second vehicle 20 and the first vehicle 10 in real time is less than the safety distance.

In other embodiments, the way of determining the safe distance includes some blocks. The taillight controller 11 obtains a driving speed of the first vehicle 10, and determines the safety distance between the first vehicle 10 and the second vehicle 20 based on the driving speed of the first vehicle 10.

For example, the safety distance (unit: m)=speed (unit: km/h)/2. The safety distance varies with the speed of the first vehicle 10.

In other embodiments, when the distance is less than the safety distance, the taillight controller 11 also determines a first brightness value of the taillight 12 based on the distance, the smaller the distance, the larger the first brightness value. The objective brightness value of the taillight 12 is determined based on the first brightness value of the taillight 12.

In one embodiment, a calculation formula of the first brightness value of the taillight is: the first brightness value=the standard brightness value+[(a legal maximum brightness−the standard brightness value)/(X−Y)]*|(Z−Y)|. The first brightness value of the taillight 12 does not exceed the legal maximum brightness of the taillight 12, and the first brightness value of the taillight 12 is larger than the standard brightness value.

Where X is a farthest detectable distance of the second vehicle 20, Y is the safe distance, and Z is the distance.

In another embodiment, the calculation formula of the first brightness value of the taillight 12 is: the first brightness value=the standard brightness value+[(the legal maximum brightness−the standard brightness value)/Y]*Z. Where Y is the safe distance, and Z is the distance.

In some embodiments, refer to FIG. 2, the lighting control system also includes a light intensity detection device 14. The light intensity detection device 14 includes a rearview mirror light sensor 141 and an ambient light sensor 142. The rearview mirror light sensor 141 and the ambient light sensor 142 are respectively communicated with the taillight controller 11.

Please refer to FIG. 3, the rearview mirror light sensor 141 can be configured on the rearview mirrors of the first vehicle 10 and be communicated with the taillight controller 11.

The rearview mirror light sensor 141 detects light intensity corresponding to light coming from the rear of the vehicle to obtain the first light intensity and transmits the first light intensity to the taillight controller 11.

The ambient light sensor 142 detects light intensity of the vehicle in driving environment to obtain the second light intensity and transmits the second light intensity to the taillight controller 11.

The taillight controller 11 can detect whether the second light intensity is lower than a second preset threshold, if the second light intensity is lower than the second preset threshold, the taillight controller 11 detects whether the first light intensity is higher than a first preset threshold, for example, the first preset threshold is 1000 lux. if the first light intensity is higher than the first preset threshold, the second vehicle 20 violates the driving safety rule of the first vehicle 10. The taillight controller 11 can obtain a second brightness value, the second brightness value is greater than the standard brightness value, and the standard brightness value is determined based on the second brightness value.

In one embodiment, the second brightness value is the legal maximum brightness of the taillight 12. The first preset threshold and the second preset threshold can be configured according to sensitivity of the human eye to light.

In some embodiments, the influence parameters include a plurality of data types. The taillight controller 11 determines a third brightness value corresponding to each type of the influence parameters among the plurality of data types of the influence parameters, when the second vehicle 20 violates the driving safety rule of the first vehicle 10 based on the plurality of the data types of the influence parameters. The taillight controller 11 sets a maximum brightness value from the third brightness values to be the objective brightness value.

In one embodiment, the taillight controller 11 can also transmit massages of working status of the taillight 12 to the gateway 15, such as whether the taillight 12 is faulty, and gateway 15 can transmit the messages to a total controller of the first vehicle 10, and the total controller can control the vehicle.

When the rear vehicle (the second vehicle 20) violates the driving safety rule of the current vehicle (the first vehicle 10), for example, when light of the rear vehicle is strong or the rear vehicle is close to the current vehicle, the brightness of the taillight 12 in the current vehicle can be adjusted to warn to the rear vehicle. When a driver of the rear vehicle observes the brightness of the taillight 12 in the front vehicle, the speed of the rear vehicle slows down to improve the driving safety rule.

In one embodiment, the lighting control method is applied to the taillight controller 11, the taillight controller 11 can be configured in the first vehicle 10 as shown in FIG. 3, the first vehicle 10 is also configured with the taillight 12, the taillight 12 is communicated with the taillight controller 11.

Figure 4:
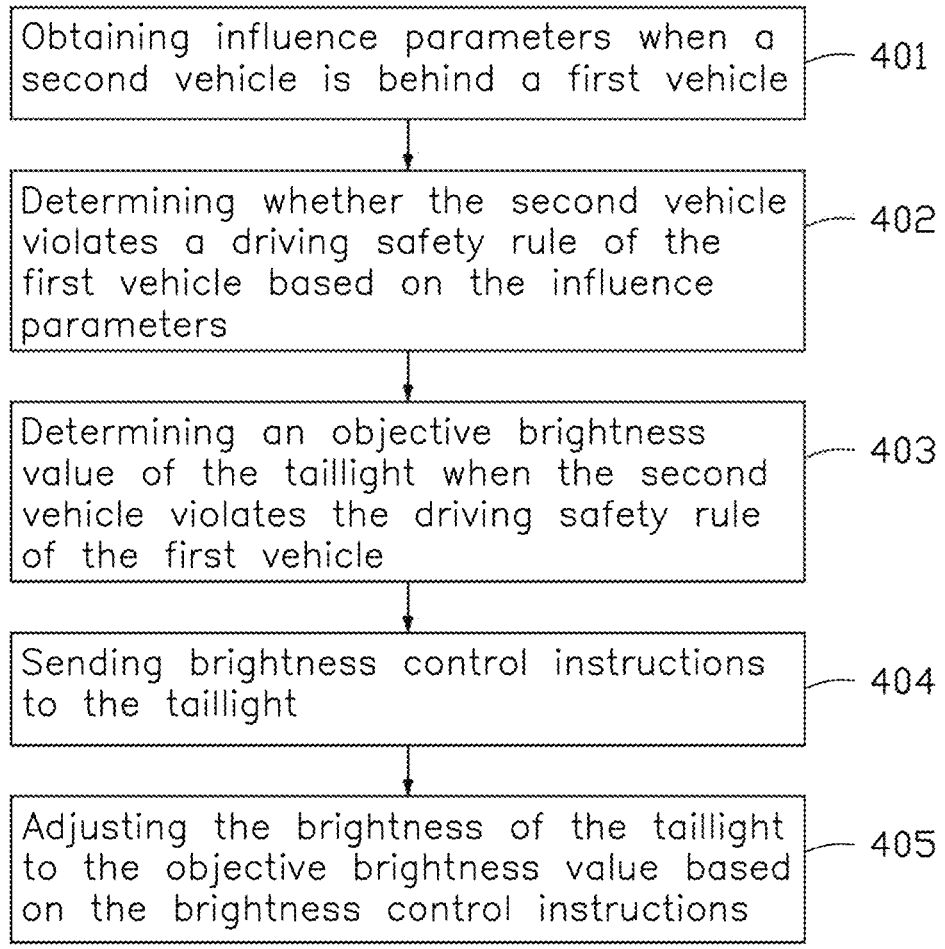
FIG. 4 is a flowchart illustrating another embodiment of a lighting control method according to the present disclosure.

FIG. 4 illustrates one exemplary embodiment of a lighting control method. The flowchart presents an exemplary embodiment of the method. The exemplary method is provided by way of example, as there are a variety of ways to carry out the method. Each block shown in FIG. 4 may determine one or more processes, methods, or subroutines, carried out in the example method. Furthermore, the illustrated order of blocks is illustrative only and the order of the blocks can change. Additional blocks can be added, or fewer blocks may be utilized, without departing from this disclosure.

In block S401, the influence parameters are obtained when the second vehicle 20 is behind the first vehicle 10.

The influence parameters indicate whether the second vehicle 20 violates the driving safety rule of the first vehicle 10. The influence parameters include the distance between the second vehicle 20 and the first vehicle 10 in real time and/or the first light intensity, the first light intensity is the light intensity of the light transmitted by the second vehicle 20 to the first vehicle 10. In the embodiment, the first light intensity is the light intensity of the light transmitted by the second vehicle 20 to a rearview mirror of the first vehicle 10.

In block S402, the second vehicle 20 is determined to violate the driving safety rule of the first vehicle 10 or not based on the influence parameters.

When the influence parameters meet preset conditions, the second vehicle 20 violates the driving safety rule of the first vehicle 10.

For example, the preset conditions include: the distance between the second vehicle 20 and the first vehicle 10 in real time is less than the safe distance between the second vehicle 20 and the first vehicle 10, and/or, the first light intensity is higher than the first preset threshold and the second light intensity is lower than the second preset threshold, where the second light intensity is the light intensity in the driving environment of the first vehicle 10.

For example, when the influencing parameters include the distance between the second vehicle 20 and the first vehicle 10 in real time, the block S402 includes: obtaining the safe distance between the first vehicle 10 and the second vehicle 20 and determining the second vehicle 20 to violates the driving safety rule of the first vehicle 10, when the distance is less than the safety distance.

In other embodiments, the way of determining the safe distance includes some blocks. The taillight controller 11 obtains the driving speed of the first vehicle 10, and determines the safety distance between the first vehicle 10 and the second vehicle 20 based on the driving speed of the first vehicle 10.

For example, the safety distance (unit: m)=speed (unit: km/h)/2.

In some embodiments, when the influence parameters include the first light intensity, the block S402 includes: obtaining the second light intensity, wherein the second light intensity is the light intensity of the first vehicle 10 in driving environment, and determining the second vehicle 20 to violate the driving safety rule of the first vehicle 10, when the first light intensity is larger than the first preset threshold, and the second light intensity is less than the second preset threshold.

In block S403, the objective brightness value of the taillight 12 is determined when the second vehicle 20 violates the driving safety rule of the first vehicle 10.

In some embodiments, the objective brightness value is larger than the standard brightness value, the standard brightness value is the brightness value of the taillight 12 when the second vehicle 20 does not violate the driving safety rule of the first vehicle 10.

In some embodiments, when the second vehicle 20 violates the driving safety rule of the first vehicle 10 based on the distance between the second vehicle 20 and the first vehicle 10 in real time, the taillight controller 11 determines the first brightness value of the taillight 12 based on the distance, wherein the smaller the distance, the greater the first brightness value. The target brightness value is determined based on the first brightness value, for example, the first brightness value is the objective brightness value.

In one embodiment, a calculation formula of the first brightness value of the taillight 12 is: the first brightness value=the standard brightness value+[(a legal maximum brightness−the standard brightness value)/(X−Y)]*|(Z−Y)|. The first brightness value of the taillight 12 does not exceed the legal maximum brightness of the taillight 12, and the first brightness value of the taillight 12 is larger than the standard brightness value.

Where X is a farthest detectable distance of the second vehicle 20, Y is the safe distance, and Z is the distance.

In another embodiment, the calculation formula of the first brightness value of the taillight 12 is: the first brightness value=the standard brightness value+[(the legal maximum brightness−the standard brightness value)/Y]*Z. Where Y is the safe distance, and Z is the distance.

In some embodiments, the taillight controller 11 obtains the second brightness value, when the second vehicle 20 violates to the driving safety rule of the first vehicle 10 based on the first light intensity. The second brightness value is greater than the standard brightness value, the objective brightness value is determined based on the second brightness value. The second brightness value is the objective brightness value.

The second brightness value can be the legal maximum brightness of the taillight 12.

When the second vehicle 20 violates the driving safety rule of the first vehicle 10 based on the plurality of the data types of the influence parameters, the taillight controller 11 takes the legal maximum brightness value of the taillight 12 as the objective brightness value.

In some embodiments, a third brightness value of each type of the influence parameter among the plurality of the data types of the influence parameters is determined, when the second vehicle 20 violates the driving safety rule of the first vehicle 10 based on the plurality of the data types of the influence parameters. The maximum brightness value from the third brightness value is set to the objective brightness value.

In block S404, the brightness control instructions is sent to the taillight 12.

In block S405, the brightness of the taillight 12 is adjusted to the objective brightness value based on the brightness control instructions.

Figure 5:
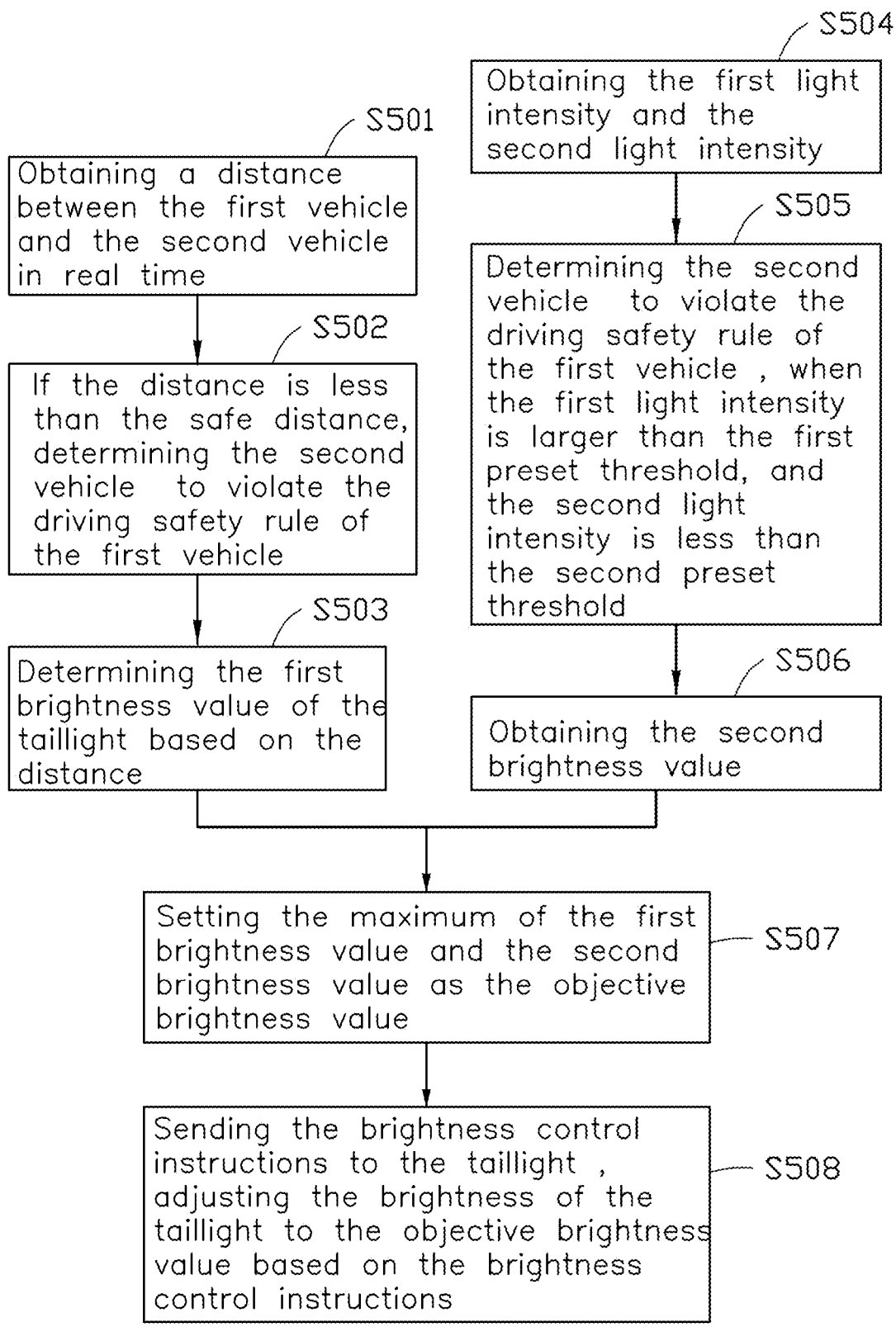
FIG. 5 is a flowchart illustrating yet another embodiment of a lighting control method according to the present disclosure.

Please refer to FIG. 5, the second vehicle 20 is behind the first vehicle 10, the influence parameters include the distance between the first vehicle 10 and the second vehicle 20 in real time and the first light brightness value of the taillight 12. The FIG. 5 illustrates some blocks of the lighting control method.

In block S501, the distance between the first vehicle 10 and the second vehicle 20 in real time is obtained.

In block S502, if the distance is less than the safe distance, the second vehicle 20 is determined to violate the driving safety rule of the first vehicle 10.

In block S503, the first brightness value of the taillight 12 is determined based on the distance.

In block S504, the first light intensity and the second light intensity are obtained.

In block S505, the second vehicle 20 is determined to violate the driving safety rule of the first vehicle 10, when the first light intensity is larger than the first preset threshold, and the second light intensity is less than the second preset threshold.

In block S506, the second brightness value is obtained.

In block S507, the maximum of the first brightness value and the second brightness value is set as the objective brightness value.

In block S508, the brightness control instructions are sent to the taillight 12, the brightness of the taillight 12 is adjusted to the objective brightness value based on the brightness control instructions.

FIG. 2 and FIG. 3 is an application scenario diagram illustrating an embodiment of a vehicle (the first vehicle 10) according to the present disclosure, the first vehicle 10 includes the taillight controller 11 and the taillight 12. The taillight controller 11 performs the lighting control method, the taillight controller 11 is communicated with the taillight 12. The taillight 12 receives brightness control instructions from the taillight controller 11 and adjusts the brightness of the taillight 12 to the objective brightness value based on the brightness control instructions.

In some embodiments, The first vehicle 10 also includes the rearview mirror light sensor 141 and the ambient light sensor 142. The rearview mirror light sensor 141 detects light intensity corresponding to light coming from the rear of the vehicle to obtain the first light intensity and transmits the first light intensity to the taillight controller 11. The ambient light sensor 142 detects light intensity of the first vehicle 10 in driving environment to obtain the second light intensity and transmits the second light intensity to the taillight controller 11.

In some embodiments, The vehicle also includes the long-range millimeter wave radar 131 and the short-range millimeter wave radar 132.

Figure 6:
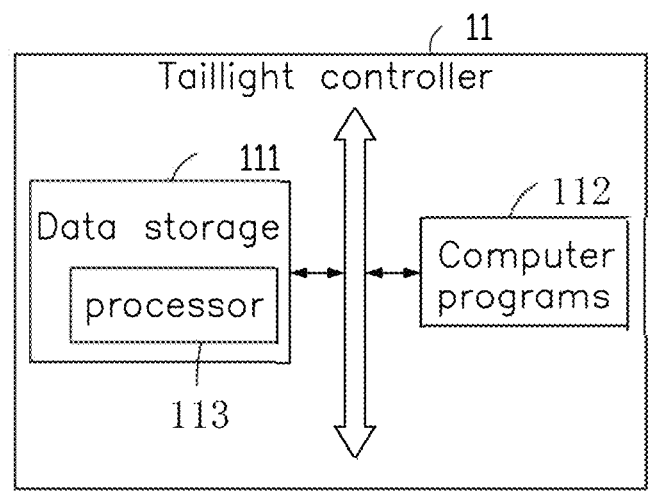
FIG. 6 is a diagram illustrating am embodiment of a taillight controller employing method.

As shown in FIG. 6, one exemplary embodiment of a taillight controller 11 includes a data storage 111, at least one processor 112 and a computer program 113. The data storage 111 stores one or more programs which can be executed by the at least one processor 112. The data storage 111 is used to store instructions, and the processor 112 is used to call up instructions from the data storage 111, the computer programs 40 is stored in the data storage 111 and run on the processor 112, so that the taillight controller 11 performs the steps of lighting control method in the above embodiment.

In one embodiment, a non-transitory storage medium recording instructions is disclosed. When the recorded computer instructions are executed by a processor of an taillight controller 11 to perform the lighting control method.

In one embodiment, the taillight controller 11 may couple to a data storage 111, the data storage 111 stores one or more programs which can be executed by the taillight controller 11 to perform the lighting control method.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A lighting control method applicable to a taillight controller, wherein the taillight controller is installed on a first vehicle, the first vehicle is equipped with a taillight, the taillight communicates with the taillight controller, the lighting control method comprising:
    obtaining influence parameters when a second vehicle is behind the first vehicle, wherein the influence parameters indicate whether the second vehicle violates a driving safety rule of the first vehicle;
    determining an objective brightness value of the taillight when the second vehicle violates the driving safety rule of the first vehicle, wherein the objective brightness value is larger than a standard brightness value, and the standard brightness value is a brightness value of the taillight when the second vehicle does not violate the driving safety rule of the first vehicle;
    sending brightness control instructions to the taillight; and
    adjusting the brightness of the taillight to the objective brightness value based on the brightness control instructions.

2. The lighting control method of claim 1, wherein the influence parameters comprise a distance between the second vehicle and the first vehicle in real time; determining the objective brightness value of the taillight comprises:
    determining a first brightness value of the taillight based on the distance, wherein the smaller the distance, the larger the first brightness value; and
    determining the objective brightness value of the taillight based on the first brightness value.

3. The lighting control method of claim 2 further comprising:
    obtaining a safety distance between the first vehicle and the second vehicle; and
    determining the second vehicle that the driving safety rule of the first vehicle is being violated when the distance is less than the safety distance.

4. The lighting control method of claim 3, wherein obtaining the safety distance between the first vehicle and the second vehicle comprises:
    obtaining a driving speed of the first vehicle; and
    determining the safety distance between the first vehicle and the second vehicle based on the driving speed of the first vehicle.

5. The lighting control method of claim 1, wherein the influence parameters comprise a first light intensity, the first light intensity is a light intensity of light transmitted by the second vehicle to the first vehicle; the lighting control method further comprises:

obtaining a second light intensity, wherein the second light intensity is a light intensity of a driving environment of the first vehicle;

determining that the second vehicle violates the driving safety rule of the first vehicle, when the first light intensity is larger than a first preset threshold, and the second light intensity is less than a second preset threshold.

6. The lighting control method of claim 1, wherein the influence parameters comprise a plurality of data types; determining the objective brightness value of the taillight comprises:

determining a third brightness value corresponding to each type of the influence parameters among the plurality of data types of the influence parameters, if the second vehicle violates the driving safety rule of the first vehicle based on the plurality of data types of the influence parameters; and setting a maximum brightness value from the third brightness values to be the objective brightness value.

7. The lighting control method of claim 2, wherein the influence parameters comprise a plurality of data types; determining the objective brightness value of the taillight comprises:

determining a third brightness value corresponding to each type of the influence parameters among the plurality of data types of the influence parameters, if the second vehicle violates the driving safety rule of the first vehicle based on the plurality of data types of the influence parameters; and setting a maximum brightness value from the third brightness values to be the objective brightness value.

8. The lighting control method of claim 5, wherein the influence parameters further comprise a plurality of data types; determining the objective brightness value of the taillight comprises:

determining a third brightness value corresponding to each type of the influence parameters among the plurality of data types of the influence parameters, if the second vehicle violates the driving safety rule of the first vehicle based on the plurality of data types of the influence parameters; and setting a maximum brightness value from the third brightness values to be the objective brightness value.

9. A vehicle comprising:

a taillight;

a taillight controller communicating with the taillight, wherein the taillight receives brightness control instructions from the taillight controller and adjusts a brightness of the taillight to an objective brightness value based on the brightness control instructions; and the taillight controller is further configured to:

obtain influence parameters when an objective vehicle is behind the vehicle, wherein the influence parameters indicate whether the second vehicle violates a driving safety rule of the first vehicle;

determine an objective brightness value of the taillight when the second vehicle violates the driving safety rule of the first vehicle, wherein the objective brightness value is larger than a standard brightness value, and the standard brightness value is a brightness value of the taillight when the second vehicle does not violate the driving safety rule of the first vehicle;

send brightness control instructions to the taillight; and adjust the brightness of the taillight to the objective brightness value based on the brightness control instructions.

10. The vehicle of claim 9, wherein the influence parameters comprise a distance between the second vehicle and the first vehicle in real time; the taillight controller is further configured to:

determine a first brightness value of the taillight based on the distance, wherein the smaller the distance, the larger the first brightness value; and determine the objective brightness value of the taillight based on the first brightness value.

11. The lighting control method of claim 10, wherein the taillight controller is further configured to:

obtain a safety distance between the first vehicle and the second vehicle; and determine the second vehicle that the driving safety rule of the first vehicle is being violated, when the distance is less than the safety distance.

12. The vehicle of claim 11, wherein the taillight controller is further configured to:

obtain a driving speed of the first vehicle; and determine the safety distance between the first vehicle and the second vehicle based on the driving speed of the first vehicle.

13. The vehicle of claim 9, wherein the influence parameters comprise a first light intensity, the first light intensity is a light intensity corresponding to a light transmitted by the second vehicle to the first vehicle; the taillight controller is further configured to:

obtain second light intensity, wherein the second light intensity is a light intensity of a driving environment of the first vehicle; and determine that the second vehicle violates the driving safety rule of the first vehicle, when the first light intensity is larger than a first preset threshold, the second light intensity is less than a second preset threshold.

14. The vehicle of claim 9, wherein the influence parameters comprise a plurality of data types; the taillight controller is further configured to:

determine a third brightness value corresponding to each type of the influence parameters among the plurality of data types of the influence parameters, if the second vehicle violates the driving safety rule of the first vehicle based on the plurality of data types of the influence parameters; and set a maximum brightness value from the third brightness values to the be objective brightness value.

15. The vehicle of claim 10, wherein the influence parameters comprise a plurality of data types; the taillight controller is further configured to:

determine a third brightness value corresponding to each type of the influence parameters among the plurality of data types of the influence parameters, if the second vehicle violates the driving safety rule of the first vehicle based on the plurality of data types of the influence parameters; and set a maximum brightness value from the third brightness values to be the objective brightness value.

16. The vehicle of claim 13, wherein the influence parameters comprise a plurality of data types; the taillight controller is further configured to:

determine a third brightness value corresponding to each type of the influence parameters among the plurality of data types of the influence parameters, if the second vehicle violates the driving safety rule of the first vehicle based on the plurality of data types of the influence parameters; and set a maximum brightness value from the third brightness values to be the objective brightness value.

17. The vehicle of claim 9, further comprising:
a rearview mirror light sensor configured on a rearview mirror of the vehicle, wherein the rearview mirror light sensor is communicated with the taillight controller, the rearview mirror light sensor detects light intensity corresponding to light coming from the rear of the vehicle to obtain a first light intensity and transmits the first light intensity to the taillight controller; and
an ambient light sensor communicated with the taillight controller, wherein the ambient light sensor detects light intensity of the vehicle in driving environment to obtain a second light intensity and transmits the second light intensity to the taillight controller.

18. A taillight controller employing method, comprising:
at least one processor; and
a data storage storing one or more programs which when executed by the at least one processor, cause the at least one processor to:
obtain influence parameters when a second vehicle is behind the first vehicle, wherein the influence parameters indicate whether the second vehicle violates a driving safety rule of the first vehicle problem;
determine an objective brightness value of the taillight when the second vehicle violates the driving safety rule of the first vehicle, wherein the objective brightness value is larger than a standard brightness value, and the standard brightness value is a brightness value of the taillight when the second vehicle does not violate the driving safety rule of the first vehicle;
send brightness control instructions to the taillight; and
adjust the brightness of the taillight to the objective brightness value based on the brightness control instructions.

* * * * *